Figure 1:
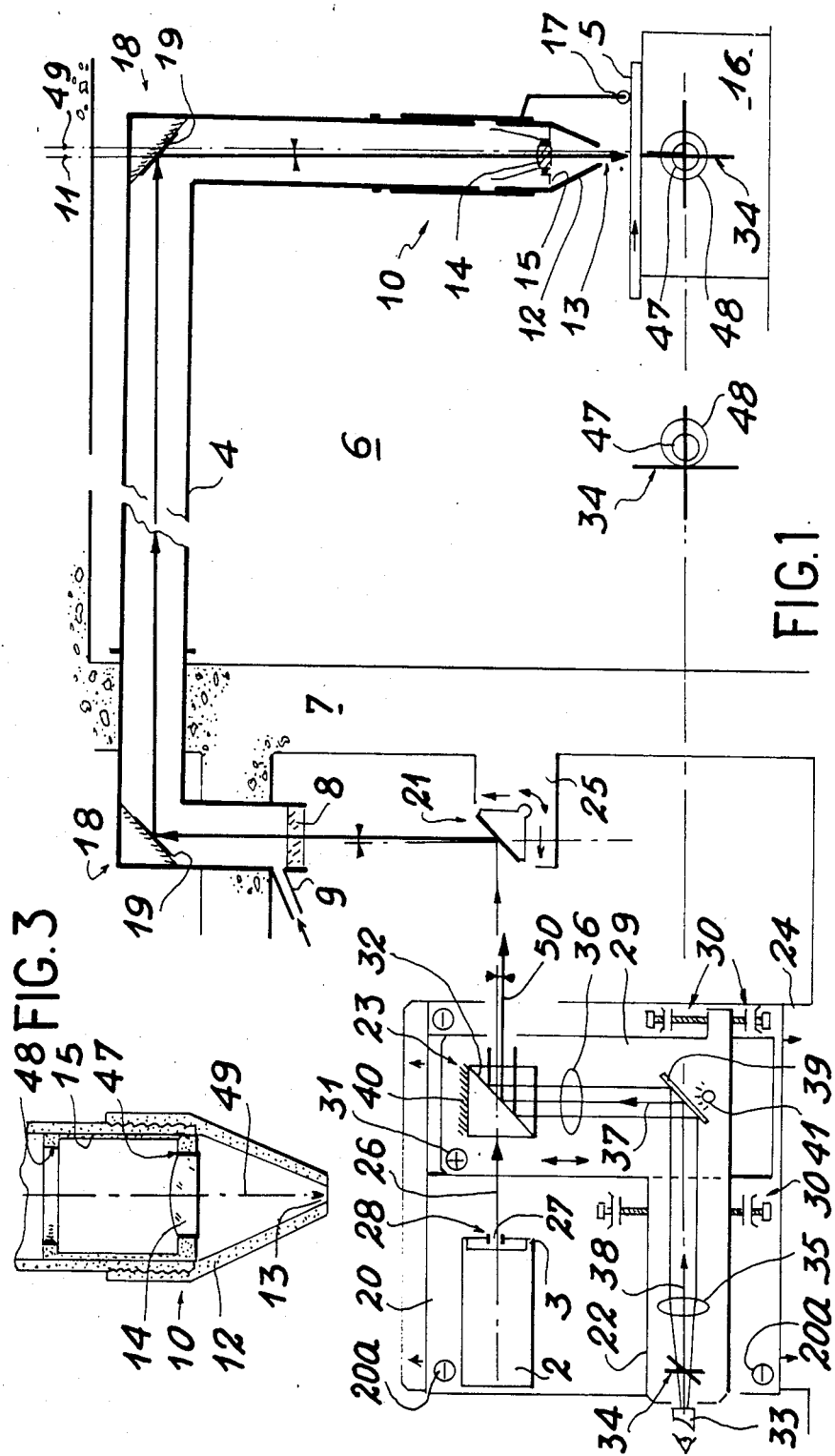

United States Patent [19]
Quinque et al.

[11] Patent Number: 4,668,088
[45] Date of Patent: May 26, 1987

[54] PROCESS AND APPARATUS FOR THE ALIGNMENT OF A LASER BEAM BY USING OPTICAL SIGHTING MEANS AND PROCESS FOR USING THE APPARATUS FOR CHECKING THE ALIGNMENT

[75] Inventors: Claude Quinque, Aubervilliers; Rene Merard, Igny, both of France

[73] Assignee: Commissariat a l'Energie Atomique, Paris, France

[21] Appl. No.: 866,988

[22] Filed: May 19, 1986

Related U.S. Application Data

[63] Continuation of Ser. No. 580,333, Feb. 15, 1984, abandoned.

[30] Foreign Application Priority Data

Feb. 17, 1983 [FR] France ................ 83 02582

[51] Int. Cl.⁴ .............................. G01B 11/26
[52] U.S. Cl. .............. 356/138; 219/121 LU; 219/121 LZ; 356/153
[58] Field of Search ........... 356/138, 153, 339, 400; 219/121 LU, 121 LV, 121 LZ

[56] References Cited

U.S. PATENT DOCUMENTS

| | | | |
|---|---|---|---|
| 3,569,993 | 3/1971 | Blin et al. | 219/121 |
| 3,843,865 | 10/1974 | Nath | 219/121 L |
| 4,015,906 | 4/1977 | Sharon | 356/138 |
| 4,530,602 | 7/1985 | Pomphrey, Jr. | 356/153 X |

FOREIGN PATENT DOCUMENTS

| | | | |
|---|---|---|---|
| 488490 | 9/1975 | Australia | . |
| 2039520 | 1/1971 | France | . |

*Primary Examiner*—F. L. Evans

[57] ABSTRACT

Process and apparatus for the alignment of a laser beam by optical sighting means and process for using the apparatus for checking the alignment.

The invention consists of preferably carrying out a sighting of the emergence or starting point of the laser beam illuminated for this purpose by means of a sight tube and beam splitting means and using the displacements of the sight tube-splitting means assembly with respect to the laser, then immobilizing the assembly with respect to the support plate carrying the laser and then performing a sighting of the target illuminated for this purpose by using the movements of the support plate and/or a laser beam orienting mirror. The alignment is checked during the operation of the laser by replacing the splitting means by a ring mirror and by observing the target.

Application to laser machining in a blind enclosure.

13 Claims, 7 Drawing Figures

PROCESS AND APPARATUS FOR THE ALIGNMENT OF A LASER BEAM BY USING OPTICAL SIGHTING MEANS AND PROCESS FOR USING THE APPARATUS FOR CHECKING THE ALIGNMENT

This application is a continuation, of application Ser. No. 580,333, filed Feb. 15, 1984, now abandoned.

The present invention relates to a process and apparatus for aligning a laser beam via optical sighting means, and to a process for using the apparatus for checking the alignment. It more particularly applies to laser machining in a blind enclosure, i.e. an enclosure whose interior can only be observed with difficulty, e.g. an enclosure containing highly radioactive material and called a "high activity" enclosure.

It is known that for machining by laser a part within a high activity enclosure, it is necessary to allow a beam produced by a power laser outside the enclosure to pass through the protective wall of the latter and for it to be focused on the part to be machined. It is also necessary to direct at the part a combustion or neutral gas and to protect the beam within the enclosure by a material wall. For this purpose, a tubular channel can be permanently placed within the enclosure, which passes through the protective wall and whose end carries means for focusing the laser beam and a nozzle for directing the gas against the part. It is also known that the nozzle opening has a small diameter, e.g. 1 mm for cutting operations. Moreover, the length of the channel can be considerable and reach e.g. 25 m.

Thus, there is a problem of aligning or positioning the laser beam on the nozzle opening, which acts as a target. This problem is difficult to solve, in view of the length of the channel, the size of the nozzle opening and the fact that the means making it possible to carry out the alignment must be located outside the enclosure. It is also a major problem, in view of the fact that this alignment is a necessary requirement for machining and that a laser beam not well centered on the nozzle opening could damage the nozzle and make machining impossible.

The object of the present invention is to solve this problem. More generally, the present invention aims at solving the problem at positioning the laser beam on a target to which there is no access.

The present invention firstly relates to an apparatus for aligning a laser beam with a target, said laser beam permitting an emergence or starting point of the laser and an emission axis passing through said emergence of starting point, wherein it comprises mobile means for the displacement of the laser beam and optical sighting means able to carry out sightings in two opposite directions and immobilizable relative to the laser, the latter and the optical sighting means being able to carry out relative displacements, in order to carry out a sighting of the starting point in one of the two directions by using relative displacements of the laser and the optical sighting means, followed by the immobilization of the latter relative to the laser and in order to carry out a sighting of the target in the other direction by using movements of the laser beam displacement means in such a way that the beam reaches the target when it is emitted by the laser.

Thus, the sighting of the starting point followed by the immobilization of the optical sighting means relative to the laser, makes it possible to fix the image of the starting point in the centre of the sight unit with which the optical sighting means are equipped. The subsequent sighting of the target makes it possible to make the image of the target coincide with the image of the starting point in the sight unit. Thus, as the two images coincide, it is certain that on operating the laser, the beam emitted by the latter will strike the target.

According to a special feature of the apparatus according to the invention, the mobile displacement means of the laser beam comprise a support plate carrying the laser.

According to another special feature of the apparatus according to the invention, the mobile laser beam displacement means also comprise a mobile mirror for intercepting the laser beam and for directing it onto the target.

According to a preferred embodiment of the apparatus according to the invention, the optical sighting means incorporate a sight tube and beam splitting means fixed with respect to the sight tube and able, on the one hand, to deflect towards the sight tube a light beam from the starting point, when the latter is illuminated in order to carry out the sighting of the starting point and, on the other hand, to deflect towards the sight tube, a light beam from the target, when the latter is illuminated in order to carry out the sighting of said target.

According to another special feature of the apparatus according to the invention, the beam splitting means incorporate a semireflecting plate inclined on the emission axis of the laser beam and integral with a mirror opposite to the sight tube with respect to the semireflecting plate.

According to another feature, the beam splitting means incorporate a semireflecting plate inclined on the emission axis of the laser beam and integral with a ring mirror perpendicular to the semireflecting plate and surrounding the latter.

According to another special feature, the target is illuminated by means of an auxiliary lighting source associated with light deflection means for ensuring that a light beam emanating from the target when the latter is illuminated by the auxiliary lighting source reaches the optical sighting means.

The light deflection means can, for example, be located at the end of the beam splitting means relative to the laser and ensure that a light emanating from the target when it is illuminated by the auxiliary light source reaches said splitting means.

According to another feature, the target is defined by a sighting axis passing through the target and defined by two reference marks integral with the target, so as to permit the replacement of the sighting of said target by a sighting along the sighting axis.

Finally, according to another special feature, the target is constituted by the opening of a nozzle associated with means for focusing the laser beam through said opening and located at one end of a channel for the propagation of the laser beam before the latter reaches the nozzle and the laser, the laser beam displacement means and the optical sighting means being located outside the channel, on the side of the other end thereof.

The present invention also relates to a process for reference marking the emission axis of a laser beam from an exit window of the laser and perpendicular thereto, wherein it consists of orienting with respect to the laser an assembly constituted by a sight tube provided with a sighting axis, an auxiliary lighting source for the sight tube and able to emit a light beam coinciding with the sighting axis of the sight tube and light deflecting means able to deflect in the direction of the exit window of the laser, the light beam emitted by the auxiliary lighting source, the latter, the sight tube and the light deflection means being fixed to one another, in such a way that the light beam deflected by the deflection means undergoes a reflection on the exit window along the laser beam emission axis by controlling said reflection by means of the sight tube.

Thus, the laser beam is simulated by autocollimation of the sight tube. This procedure is preferably used for sighting the starting point as referred to hereinbefore.

The present invention also relates to a process for the alignment of a laser beam with a target, said laser beam allowing a starting point on the laser, wherein it comprises providing the laser mounted on a support plate with optical sighting means incorporating an auxiliary lighting source and which serves to carry out sightings in two opposite directions and so that a light beam from the auxiliary source propagates in one of the two directions, carrying out in said direction a sighting of the starting point of the laser beam illuminated in this way by the auxiliary source by means of an orientation of the optical sighting means relative to the laser, so as to simulate the laser beam by the beam from the auxiliary source, immobilizing the optical sighting means relative to the laser and sighting the target illuminated for this purpose in the other direction by using the movements of the support plate and/or a laser beam orienting mirror.

The present invention finally relates to a process for using the apparatus according to the invention and described hereinbefore and in which the optical sighting means incorporate a sight tube and beam splitting means, wherein for also checking the alignment which has been made, the beam splitting means are replaced by a ring mirror arranged in such a way that it is traversed by the laser beam, when the laser is operating and deflects towards the sight tube a light beam from the target illuminated by the laser.

Thus, the present invention makes it possible to carry out a control (which can be called "static", because the laser does not operate) of the positioning of the laser beam, followed by a possible check and then a control (which can be called "dynamic" of said position, with the laser operating.) The sightings of the starting point and the target can be made by observing said starting point and said target by means of optical sighting means, using the naked eye or a television camera associated with a television receiver, equipped with a display screen.

The invention is described in greater detail hereinafter relative to non-limitative embodiments and with reference to the attached drawings, wherein show:

FIG. 1 a diagrammatic view of a special embodiment of the apparatus according to the invention, applied to the positioning of a machining laser beam on the opening of a nozzle forming part of a machining head.

Figure 2:
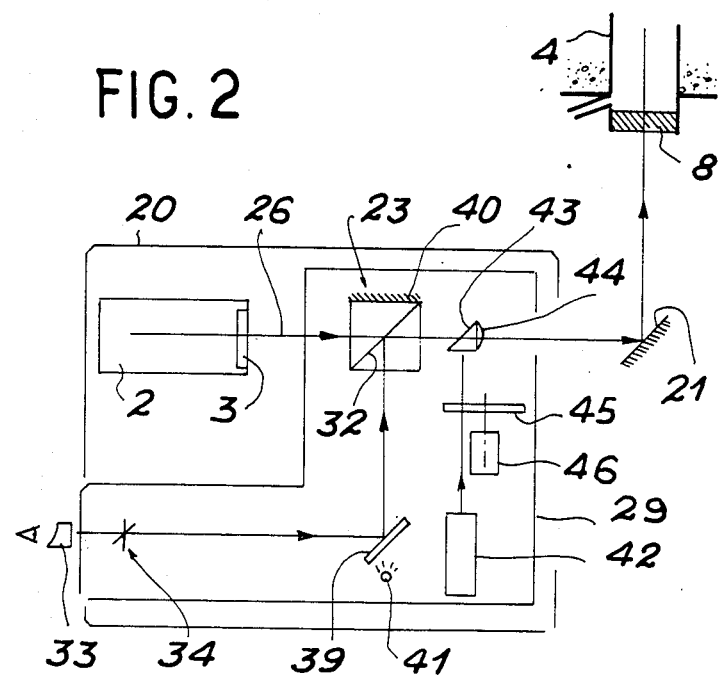

FIG. 2 a diagrammatic view of a special embodiment of the beam splitting means forming part of the apparatus of FIG. 1 and means for illuminating the two marks on a special constructional embodiment of the machining head and permitting an indirect sighting of the nozzle opening.

FIG. 3 a diagrammatic view of said special embodiment of the machining head.

Figure 4:
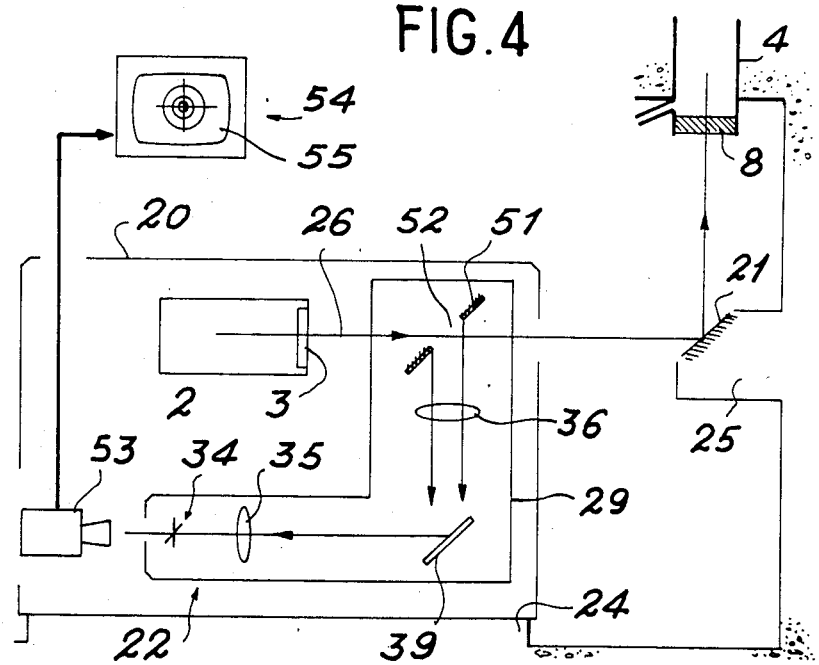

FIG. 4 a diagrammatic view of means making it possible to check the positioning of the beam from the laser, when the latter is in operation.

Figure 5:
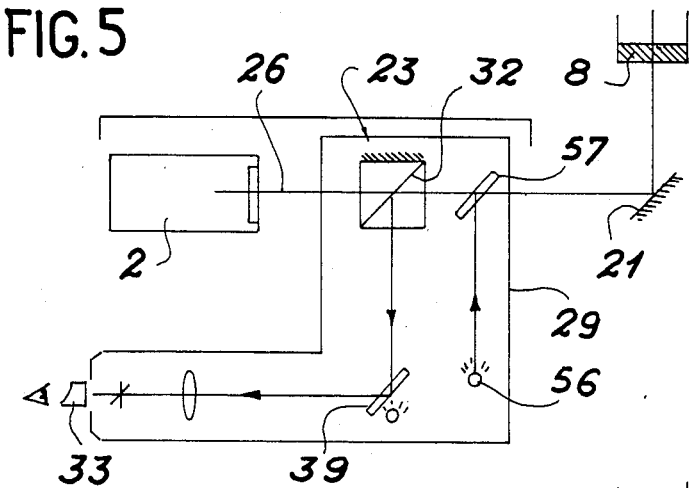
Figure 6:
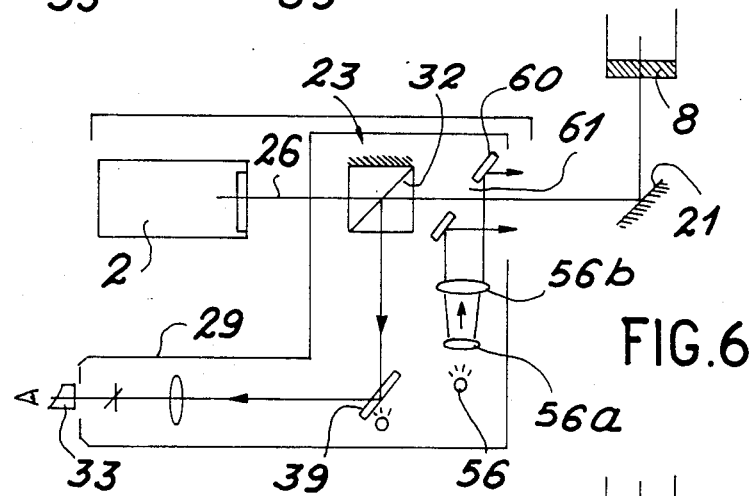

FIGS. 5 and 6, diagrammatic views of other embodiments of the means for illuminating the two marks.

Figure 7:
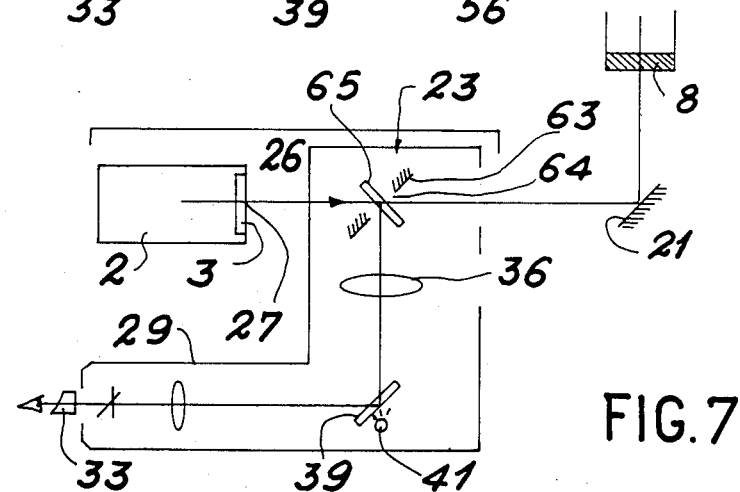

FIG. 7 a diagrammatic view of another embodiment of the beam splitting means.

FIG. 1 diagrammatically shows a special embodiment of the apparatus according to the invention, incorporated into an installation making it possible to machine, by means of a laser beam, metal parts arranged in an enclosure to which there is no access. The installation essentially comprises a power laser 2, e.g. a carbon dioxide gas laser, provided with an exit window 3 for the laser beam, which is flat and e.g. of SeZn and a tubular channel 4 for the propagation of the beam from the operating laser.

Each part 5 to be machined is located in an enclosure 6 in which there is a high radioactivity. This enclosure 6 is separated from the exterior by a protective wall 7. Channel 4 passes through the protective wall 7 and has at its end located outside the enclosure, a flat e.g. SeZn window 8 for the entry of the laser beam into channel 4, as well as a tube 9 linked with said channel and permitting the introduction of a neutral or combustion gas into said channel. The other end of the latter has a machining head 10, which can be moved in translation along the axis 11 of the channel.

Machining head 10 is terminated by a nozzle 12 provided with an opening 13 and with means 14 for focusing the laser beam, mounted on a support 15 within the machining head in front of opening 13. These focusing means 14 serve to focus the laser beam through opening 13 onto part 5, which is e.g. displaceable on a support 16. In the case of a vertical machining head, a roller 17 fixed from one side to the machining head 14 and rubbing from the other side against part 5, makes it possible to keep the distance between nozzle opening 13 and part 5 constant. It is also possible to use for this purpose known controlled means making it possible to operate at a constant frontal distance and which can be used in the case of a vertical or a non-vertical machining head. Tubular channel 4 can have a plurality of bends 18. Flat mirrors 19 are then associated with these bends 18 and are positioned within channel 4 so as to bring about the successive deflections of the laser beam to ensure that the latter reaches the focusing means 14 and, if well positioned, passes through opening 13. The focusing means are, for example, constituted by an e.g. SeZn convergent lens. Obviously, they could also be constituted by other means, such as a parabolic concave mirror.

Thus, the invention makes it possible to align or position the laser beam with the opening 13 of nozzle 12, in such a way that said beam is focused on part 5 to be machined without damaging opening 13 and without any intervention on the part of an operator in connection with nozzle 12. For this purpose, the aforementioned machining installation is supplemented by the apparatus according to the invention, whereof a special embodiment is diagrammatically shown in FIG. 1 and which essentially comprises mobile means for the displacement of the laser beam constituted by a support plate 20 carrying laser 2 and a mobile flat mirror 21, as well as optical sighting means constituted by a sight tube 23 and beam splitting means 23.

The respective positions of laser 2 and mobile mirror 21 are such that a beam emitted by the laser can reach mirror 21 and can be injected by the latter into tubular channel 4. Support plate 20 carrying laser 2 is displaceable in translation relative to a fixed chassis 24 and the mobile mirror 21 is displaceable in translation and/or rotation relative to a fixed support 25, so as to be able to regulate the position and orientation of the beam emitted by laser 2. For example, the entrance window 8 of the laser beam into channel 4 is perpendicular to the plane of FIG. 1. Support plate 20 carrying laser 2 can be moved relative to chassis 24 in a direction parallel to a normal to the entrance window 8 and in another direction perpendicular to the plane of FIG. 1. It can be immobilized relative to chassis 24 by screws 20a. Laser 2 emits a beam directed along an axis 26 called the "emission axis", which is perpendicular to the exit window 3 and comes from a point 27 in the latter, called the "laser beam starting point", which is defined by a mark 28 on the exit window 3. Laser 2 is mounted on support plate 20 in such a way that the laser beam emission axis 26 is parallel to the plane of FIG. 1 and perpendicular to a normal to the entrance window 8. The mobile mirror 21 can then be a flat mirror facing the exit window 3 and the entrance window 8 and rotatable about an axis contained in the plane of said mirror and parallel 1 to exit window 3 and entrance window 8.

The sight tube 22 and the beam splitting means 23 are mounted on an auxiliary support plate 29, displaceable relative to support plate 20, in front of the laser beam exit window 3, in a direction perpendicular to the laser beam and parallel to the plane of FIG. 1, by means of an adjustment and locking screw assembly 30. This also makes it possible to immobilize auxiliary support plate 29 relative to support plate 20 and in another direction perpendicular to the plane of FIG. 1 by using an adjustment screw 31.

The beam splitting means 23 consist of a transparent beam splitter cube having a semireflecting diagonal plane 32, which therefore constitutes a semireflecting plate.

The splitter cube 23 is mounted on the auxiliary support plate 29, in such a way that the semireflecting plate 32 is intersected by the laser beam emission axis 26 and forms therewith an angle of 45°, so that the cube 23 has two faces parallel to the laser beam exit window 3. The sight tube 22 successively has a sight unit 33, provided with a reticle 34, an eyepiece 35 and an objective 36. The latter faces the semireflecting plate 32. Axis 37 of objective 36, called the "sighting axis", is perpendicular to axis 38 of eyepiece 35. A semitransparent flat mirror 39 is located at the intersection of axes 37 and 38 at 45° therefrom. One face 40 of the splitter cube 23, located at the rear thereof with respect to objective 36, is made completely reflecting and consequently forms a flat mirror. Sight tube 22 is provided with an auxiliary source 41 located behind the semitransparent mirror 39 with respect to objective 36.

As is diagrammatically shown in FIG. 2, the auxiliary support plate 29 also carries means for illuminating opening 13 of nozzle 12 (FIG. 1), which consist of an auxiliary lighting source 42 and light deflection means 43. It is preferable not to use auxiliary source 41 for illuminating the nozzle, because it is not sufficiently intense and its use would increase noise by reflection on the sight tube objective. The auxiliary lighting source 42, is, for example, constituted by a He-Ne laser and the light deflection means are, for example, constituted by a totally reflecting prism, whose reflection plane is opaque, in order to eliminate all stray light and whose outlet face which is turned towards the mobile mirror 21 is, if necessary, provided with a convergent lens for obtaining an adequate illumination. Prism 43 is located on emission axis 26, opposite to the power laser 2 with respect to the splitter cube 23. Moreover, the dimensions of the edges of the prism are smaller than those of the splitter cube 23. For example, the edges of this cube are ten times larger than those of the prism 43. The He-Ne laser 42 is placed on auxiliary support plate 29 in such a way as to transmit a light beam in the direction of prism 43. This beam is then deflected in the direction of mobile mirror 21 and is then injected into tubular channel 4. A non-homogeneous transparent disk 45, associated with a motor 46 for the rotation thereof, is placed between prism 43 and the He-Ne laser 42 and transversely with respect to the beam to be emitted by the latter, so as to eliminate the spatial coherence of this beam and consequently the granularity phenomena resulting from the reflection of the beam on an object.

FIG. 3 diagrammatically shows the machining head 10 terminated by nozzle 12. Within the machining head 10 is provided the support 15 on which are mounted the focusing lens 14, as well as a first ring 47 and a second ring 48 having a diameter larger than the first ring 47. The latter surrounds the focusing lens 14 and the second ring 48 is located on the opposite side to opening 13 of nozzle 12 with respect to lens 14. Moreover, the two rings 47, 48 are mounted on their common support 15, so that they have the same axis 49, which passes through opening 13. Lens 14 is also mounted on support 15, so as to permit axis 49 to be the optical axis. Axis 49, which is common to the two rings 47, 48, forms a sighting axis for opening 13, which permits the replacement of the sighting of the latter by sighting along said sighting axis 49.

Without putting the power laser 2 into operation (FIG. 1), it is possible to observe in sight unit 33 of sight tube 22, the image of the starting point 27 of exit window 3, by putting the auxiliary source 41 into operation. Thus, the light emitted by the latter passes through the semitransparent mirror 39, objective 36 and then semireflecting plate 32 and is then successively reflected on the totally reflecting face 40 of splitter cube 23 in the direction of the semireflecting plate 32, on the latter in the direction of the exit window 3, on the latter in the direction of the semireflecting plate 32, on the latter in the direction of the totally reflecting face 40 and then on the latter in the direction of the reflecting plate 32, which it traverses together with objective 36 for reflection on semitransparent mirror 39 in the direction of sight unit 33.

In the same way by putting the He-Ne laser 42 into operation (FIG. 2), it is possible to observe in sight unit 33 the image of the two rings 47, 48 (FIG. 3) permitting the reference marking of opening 13 of nozzle 12. Thus, the light emitted by the He-Ne laser 42 is transmitted by the totally reflecting prism 43 in the direction of mobile mirror 21 and is then injected by the latter into the tubular channel 4 and is propagated, by auxiliary mirrors 18 (FIG. 1), in the direction of rings 47, 48 (FIG. 3), is reflected on the latter, then reaches the mobile mirror 21 again due to the principle of the inverse return of light, is reflected on the latter in the direction of the semireflecting plate 32, is reflected in the direction of semitransparent mirror 39 and finally reaches the sight unit 33.

In order to align or position the beam emitted by power laser 2 without putting the latter into operation, the following procedure is adopted. Using sight tube 22 and by putting into operation auxiliary source 41 (FIG. 1), a sighting is performed of the starting point 27 of window 3 defined by mark 28, i.e. the image of said point 27 is made to coincide with the centre of reticule 34, by displacing the auxiliary support plate 29 relative to the power laser 2. When coincidence has been brought about, the auxiliary support plate 29 is immobilized relative to support plate 20 carrying laser 2. It is then possible to confirm that the light beam 50 emitted by the auxiliary source 41 coincides, after reflection on the semitransparent plate 32, with the emission axis 26 and consequently "simulates" the latter.

With the aid of sight tube 22 and by putting the He-Ne laser 42 into operation (FIG. 2), a sighting then takes place with opening 13 of nozzle 12. By displacing support plate 20 carrying power laser 2 with respect to the chassis 24 and/or pivoting mobile mirror 21 relative to its support 25, the image of opening 13 is made to coincide with the centre of reticule 34. Thus, the sighting of opening 13 is replaced by equivalent of two rings 47, 48, i.e. by bringing about coincidence between the images of the centres of these two rings, defined by the sighting axis 49 common to said rings 47, 48 with the centre of reticule 34. Thus, as a result of the double coincidence of the respective images of starting point 27 and opening 13 (or the equivalent effect obtained with the two rings 47, 48) with the centre of reticule 34, it is certain that power laser 2 is correctly positioned so that, when it operates, the laser beam emitted by it is aligned with the opening 13 of nozzle 2, i.e. it passes through said opening 13 to reach the part 5 to be machined and consequently does not strike the nozzle at other points, which could damage it.

The aforementioned alignment or positioning control of the laser beam and which can be called a "static control" because it is carried out without operating power laser 2, can be checked when the latter is operating and can be modified by a further control called a "dynamic control" in view of the fact that it is carried out when laser 2 is in use. Thus, this dynamic control will now be explained relative to FIG. 4.

Before putting the power laser 2 into operation, the beam splitting means 23 are replaced by a flat ring mirror 51, provided with a central opening 52. Ring mirror 51 is fixed to auxiliary support plate 29, which is itself immobilized relative to support plate 20 carrying laser 2, so that the ring mirror 51 faces the semitransparent mirror 39 or is parallel to the latter and is inclined by 45° relative to the laser beam emission axis and so that its central opening 52 is traversed by the emission axis 26. Power laser 2 is then put into operation for machining part 5 (the laser beam then passing through the central opening 52). When it is wished to check the alignment which has been carried out, laser 2 is operated in pulse-like manner and at a very low energy level as a light source for illuminating opening 13 of nozzle 12 to check whether the image of this opening 13 still coincides with the centre of reticule 34. If the laser impacts occur round the nozzle opening, they bring about a light emission by local heating of the metal. This light source illuminates opening 13 of opening 12. If the impacts pass through opening 13, there is no light source and alignment is correct. In this case, it is possible to place a metal part at the end of nozzle 12 and the hypothesis is then that the laser impacts would strike in the vicinity of opening 13.

The alignment can be checked by direct observation through the sight tube 22, or by using a television camera 53 fitted at the end of reticule 34 and associated with a television receiver 54 having a display screen 55, which tends to make the observations easier.

Part of the light emitted by the impacts of the power laser 2 on part 5 to be machined is reflected through opening 13 in the direction of mobile mirror 21, by the latter in the direction of ring mirror 51, by the latter in the direction of semitransparent mirror 39 and by the latter in the direction of camera 53. When the image of opening 13 does not coincide with the centre of reticule 34, it is possible to correct the alignment of the laser beam by displacing support plate 20 carrying laser 2 relative to chassis 24 and/or by pivoting the mobile mirror 21 relative to its support 25 until the laser beam passes correctly through opening 13 of nozzle 12.

FIG. 5 diagrammatically shows another embodiment of the means for illuminating opening 13 of nozzle 12. The He-Ne laser 42 and the prism 43 shown in FIG. 2 are respectively replaced by an incoherent light source 56 and by a semitransparent plate 57. The latter is fixed to auxiliary support plate 29 opposite to the splitter cube 23 relative to power laser 2 and so as to intersect the laser beam emission axis 26. The respective arrangements of this semitransparent plate 57 and the incoherent light source 56 are also such that the light emitted by this source 56 reaches the semitransparent plate 57 and is reflected there in the direction of mobile mirror 21. As explained hereinbefore, this light then reaches the two rings 47, 48 (FIG. 3), is reflected on the latter and is returned, according to the principle of the inverse return of light, to the semitransparent plate 57, partly traverses the latter and is then deflected by the semitransparent plate 32 of the beam splitting means 23 in the direction of semitransparent mirror 39, which transmits it into sight unit 33. The incoherent light source 56 is, for example, a mercury arc lamp.

FIG. 6 diagrammatically shows another embodiment of the means for illuminating opening 13 of nozzle 12. In this other special embodiment, the incoherent light source 56 associated with a condenser 56a and an objective 56b is retained and the prism 43 (FIG. 2) is replaced by a flat ring mirror 60 having a central opening 61. Ring mirror 60 is fixed to auxiliary support plate 29 opposite power lever 2 relative to the beam splitting means 23 and in such a way that the laser beam emission axis 26 passes through the central opening 61. Moreover, the respective arrangements of ring mirror 60 and incoherent light source 56 are such that the light emitted by said source 56 is reflected on ring mirror 60 in the direction of mobile mirror 21. As explained hereinbefore, this light then reaches the two rings 47, 48, is reflected by them and returned, in accordance with the principle of the inverse return of light, in the direction of ring mirror 60, through which it can partly pass due to the central opening 61 in order to reach the semireflecting plate 32, where it is reflected in the direction of semitransparent mirror 39, which then transmits it into sight unit 33.

FIG. 7 diagrammatically shows another embodiment of the beam splitting means 23 having a flat ring mirror 63 with a central opening 64 and a semireflecting plate 65 perpendicular to ring mirror 63. The latter is fixed to the auxiliary support plate 29 facing the semitransparent mirror 39. It forms an angle of 45° with the laser beam emission axis 26 and its central opening 64 is traversed by the emission axis 26. Semireflecting plate 65 is also traversed by emission axis 26. For this purpose, plate 65 is given a sufficiently small size to be inserted in central opening 64.

Semireflecting plate 65 carries out the sighting of starting point 27, when the latter is illuminated by means of auxiliary source 41. The light emitted by the latter passes through the semitransparent mirror 39 and is successively reflected on semireflecting plate 65, on exit window 3, again on semireflecting plate 65 and finally on semitransparent mirror 39, to finally reach the sight unit 33. Ring mirror 63 is used for sighting opening 13 of nozzle 12 (FIG. 1), obviously when rings 47 and 48 (FIG. 3) are illuminated. This ring mirror 63 intercepts the light deflected by the mobile mirror 21 and reaching the tubular channel 4 and transmits this light in the direction of the semitransparent mirror 39, in such a way that this light reaches the sight unit 33. It should be noted that the ring mirror 63 also makes it possible to dynamically control the alignment of the laser beam, as explained hereinbefore. To carry out this control, it is merely necessary to remove the semireflecting plate 65 and the annular mirror 63 is then directly in a good position for the dynamic control.

If the light source used is a helium-neon laser, the illumination is sufficiently powerful for part of the light beam passing through plate 65 via window 3 to illuminate the focusing lens 14, which produces a spot on the latter. The ring mirror is then oriented in such a way that the image of this spot is centered on the reticule of the sight tube. Thus, the optical axis of the laser can be centered on the lens.

In the aforementioned embodiments, reference has been made to optical sighting means immobilized relative to the power laser 2 (FIG. 1) in such a way that the sighting axis 37 respectively forms with the emission axis 26 of the laser beam and with the light beam from opening 13 of nozzle 12 (or the equivalent light beam when considering the two rings 47, 48 instead of opening 13) supplementary angles, both of which are equal to 90°. It is obviously possible to choose optical sighting means and to orient these relative to laser 2, in such a way that these two angles remain supplementary without being equal to 90°.

We claim:

1. Apparatus for aligning the beam of a laser with a target, comprising:

mobile displacement means for displacing the laser beam, the beam emerging from the laser at a starting point and propagating along an emission axis of the laser;

optical sighting means for sighting in two opposite directions along two viewing paths, portions of each said viewing paths coinciding with a path of the laser beam, one of said viewing paths providing a sighting of said starting point;

positioning means for adjusting the position of said optical sighting means relative to said displacement means to enable said one of said viewing paths to provide the sighting of said starting point, and means for locking said positioning means to said displacement means to maintain optical alignment along said one of said viewing paths: and wherein a second of said viewing paths is displaceable by said displacement means for sighting the target, displacement of the laser beam by the displacement means providing for alignment of the beam with the target for illumination of the target by the beam; and wherein said displacement means includes means for immobilizing said second viewing path relative to the laser upon alignment of the laser beam with the target, thereby to permit said sighting of the target.

2. Apparatus according to claim 1 wherein said displacement means includes a moble support plate for carrying the laser.

3. Apparatus according to claim 1, wherein said displacement means includes a mobile mirror for intercepting the laser beam and for directing the beam onto the target.

4. Apparatus according to claim 1, further comprising means external to said laser for illuminating the starting point and the target with illuminating light, and wherein said optical sighting means includes a sight tube and beam-splitting means fixed in position relative to said sight tube, said beam-splitting means deflecting a beam of the illuminating light from the starting point towards said sight tube upon illumination of the starting point by said illuminating means to enable the sighting of the starting point, said beam-splitting means deflecting a beam of the illuminating light from the target towards said sight tube upon illumination of the target by said illuminating means to enable the sighting of the target.

5. Apparatus according to claim 4, wherein said beam-splitting means comprises a mirror located opposite to said sight tube, and a semireflecting plate inclined on the emission axis of the laer beam and integral with said mirror.

6. Apparatus according to claim 4, wherein said beam-splitting means comprises a ring mirror and a semireflecting plate inclined on the emmision axis of the laser beam and integral with said mirror, said ring mirror being perpendicular to said semireflecting plate and surrounding said semireflecting plate.

7. Apparatus according to claim 1, further comprising light deflecting means and an auxiliary lighting source associated with said deflecting means for illuminating the target and producing a light beam therefrom, the light beam from the target propagating to the sighting means.

8. Apparatus according to claim 1, wherein the target is defined by a sighting axis passing through said target and further defined by two marks integral with the target, so as to permit a sighting of the target by a sighting along the sighting axis.

9. Apparatus according to claim 1, further comprising a channel for conduction of laser radiation from the laser to the target, and wherein the largest includes a nozzle located at a first end of the channel, said nozzle incorporating an opening and means for focusing laser radiation through the opening, and wherein said said displacement means and said sighting means are located outside said channel at a second end thereof opposite said first end.

10. A method for alignment of a laser beam with a target, comprising:

mounting a laser on a support plate, said laser producing a beam emanating from a starting point on the laser;

optically coupling a sighting means incorporating an auxiliary lighting source to the laser, said sighting means enabling sightings by light of said source in two opposite directions;

sighting on said starting point by directing light of said source via said sighting means toward said laser;

immobilizing said optical sighting means relative to said laser; and sighting on said target via said sighting means.

11. A method according to claim 10 wherein said step of sighting the target is accomplished by moving the support plate.

12. A method according to claim 10 wherein said sighting means includes a laser beam orienting mirror, and wherein said step of sighting the target is accomplished by moving the orienting mirror.

13. Apparatus for aligning the beam of a laser with a target, comprising:

mobile displacement means for displacing the laser beam, the beam emerging from the laser at a starting point and propagating along an emission axis of the laser;

optical sighting means for sighting in two opposite directions along two viewing paths, portions of each said viewing paths coinciding with a path of the laser beam, one of said viewing paths providing a sighting of said starting point;

positioning means for adjusting the position of said optical sighting means relative to said displacement means to enable said one of said viewing paths to provide the sighting of said starting point, and means for locking said positioning means to said displacement means to maintain optical alignment along said one of said viewing paths;

means external to said laser for illuminating the starting point and the target with illuminating light; wherein a second of said viewing paths is displaceable by said displacement means for sighting the target, displacement of the laser beam by the displacement means providing for alignment of the beam with the target for illumination of the target by the beam; wherein said displacement means includes means for immobilizing said second viewing path relative to the laser upon alignment of the laser beam with the target, thereby to permit said sighting of the target; and wherein said optical sighting means includes a sight tube and a ring mirror fixed in position relative to said sight tube, said ring mirror being positioned for traversal of the laser beam therethrough during operation of the laser, said ring mirror deflecting a beam of light reflected from the target towards said sight tube upon illumination of the target by the laser beam.

* * * * *